(12) United States Patent
Inoue et al.

(10) Patent No.: US 10,807,573 B2
(45) Date of Patent: Oct. 20, 2020

(54) DRIVING ASSISTANCE CONTROL APPARATUS OF VEHICLE

(71) Applicants: TOYOTA JIDOSHA KABUSHIKI KAISHA, Toyota-shi, Aichi-ken (JP); National University Corporation Tokyo University of Agriculture and Technology, Fuchu-shi, Tokyo (JP); THE UNIVERSITY OF TOKYO, Bunkyo-ku, Tokyo (JP)

(72) Inventors: Shintaro Inoue, Kanagawa-ken (JP); Hideo Inoue, Kanagawa-ken (JP); Pongsathorn Raksincharoensak, Fuchu (JP); Yuichi Saito, Fuchu (JP); Masao Nagai, Fuchu (JP); Takuma Ito, Tokyo (JP); Tsukasa Shimizu, Nagakute (JP)

(73) Assignees: TOYOTA JIDOSHA KABUSHIKI KAISHA, Toyota-shi, Aichi-ken (JP); National University Corporation Tokyo University of Agriculture and Technology, Fuchu-shi, Tokyo (JP); THE UNIVERSITY OF TOKYO, Bunkyo-ku, Tokyo (JP)

(*) Notice: Subject to any disclaimer, the term of this patent is extended or adjusted under 35 U.S.C. 154(b) by 164 days.

(21) Appl. No.: 15/587,844

(22) Filed: May 5, 2017

(65) Prior Publication Data
US 2017/0327094 A1 Nov. 16, 2017

(30) Foreign Application Priority Data
May 16, 2016 (JP) ................................. 2016-097595

(51) Int. Cl.
 B60T 7/22 (2006.01)
 B60W 30/09 (2012.01)
 B62D 15/02 (2006.01)

(52) U.S. Cl.
 CPC ............... B60T 7/22 (2013.01); B60W 30/09 (2013.01); B62D 15/02 (2013.01); (Continued)

(58) Field of Classification Search
 CPC ................................. B60T 7/22; B60W 30/09
 See application file for complete search history.

(56) References Cited

U.S. PATENT DOCUMENTS 5,926,114 A * 7/1999 Andrews ................ G08G 1/164
 180/167
6,307,484 B1 10/2001 Sasaki et al.
(Continued)

FOREIGN PATENT DOCUMENTS

JP 11-53694 A 2/1999
JP 2009-173121 A 8/2009
(Continued)

OTHER PUBLICATIONS

Takahiro Hasegawa et al.: "Study on Autonomous Driving Intelligence System by Using Optimal Control Considering Risk Potential," pp. 27-32, Society of Automotive Engineers of Japan, Proceedings of Academic Symposium 20145871, 2014.
(Continued)

*Primary Examiner* — Donald J Wallace
(74) *Attorney, Agent, or Firm* — Sughrue Mion, PLLC

(57) ABSTRACT

A driving assistance control apparatus of a vehicle includes a blind area detector, a driving operation detector, and an electronic control unit. The blind area detector is configured to detect the presence or absence of a blind area as seen from the vehicle in a traveling direction of the vehicle. The
(Continued)

driving operation detector is configured to detect driving operation of the driver. The electronic control unit is configured to perform automatic deceleration control of the vehicle based on detection of the presence of the blind area by the blind area detector. The electronic control unit is configured to start the automatic deceleration control, by referring to the driving operation of the driver after detection of the presence of the blind area by the blind area detector.

9 Claims, 5 Drawing Sheets

(52) U.S. Cl.
CPC ..... *B60T 2201/022* (2013.01); *B60T 2220/00* (2013.01); *B60T 2220/02* (2013.01); *B60T 2220/06* (2013.01)

(56) References Cited

U.S. PATENT DOCUMENTS

| | | | | |
|---|---|---|---|---|
| 2005/0090984 A1* | 4/2005 | Kobayashi | ......... | B60K 31/0008 701/301 |
| 2007/0032914 A1* | 2/2007 | Kondoh | ............... | B60W 50/16 701/1 |
| 2008/0065293 A1* | 3/2008 | Placke | ............... | B60K 31/0008 701/41 |
| 2014/0188365 A1* | 7/2014 | Nagata | ..................... | B60T 7/22 701/93 |
| 2014/0195141 A1* | 7/2014 | Nagata | ..................... | B60T 7/22 701/301 |
| 2015/0046058 A1* | 2/2015 | Nagata | ..................... | B60T 7/22 701/93 |
| 2015/0158482 A1* | 6/2015 | Kaminade | ................. | G01S 3/86 701/1 |
| 2016/0068143 A1* | 3/2016 | Schanz | ............... | B60W 10/184 701/70 |
| 2016/0332569 A1* | 11/2016 | Ishida | ................... | B60W 30/08 |
| 2017/0106876 A1* | 4/2017 | Gordon | ............... | B60W 50/082 |
| 2017/0305418 A1* | 10/2017 | Bae | .................. | B60W 50/0098 |
| 2017/0329001 A1* | 11/2017 | Brandt | ............... | G06K 9/00791 |

FOREIGN PATENT DOCUMENTS

| | | |
|---|---|---|
| JP | 2009-286279 A | 12/2009 |
| JP | 2013-77153 A | 4/2013 |
| JP | 2013-171439 A | 9/2013 |
| JP | 2013-196032 A | 9/2013 |
| JP | 2015-82157 A | 4/2015 |

OTHER PUBLICATIONS

Yuichi Saito et al.: "Design and Evaluation of a Risk Predictive Brake Control with Potential Risk Prediction based Driver Model," pp. 1615-1620, published May 23, 2016.

Pongsathorn Raksincharoensak, "Obstacle Avoidance Motion Control for Automobile through Risk Potential Prediction", Measurement and Control, Japan, Public Interest Incorporated Association, Soc. of Instrument and Control Engineers, Nov. 20, 2015, vol. 54, No. 11, pp. 820-823 (total 4 pages).

English Translation of Japanese Office Action dated Mar. 16, 2018 in JP Application No. 2016-097595.

* cited by examiner

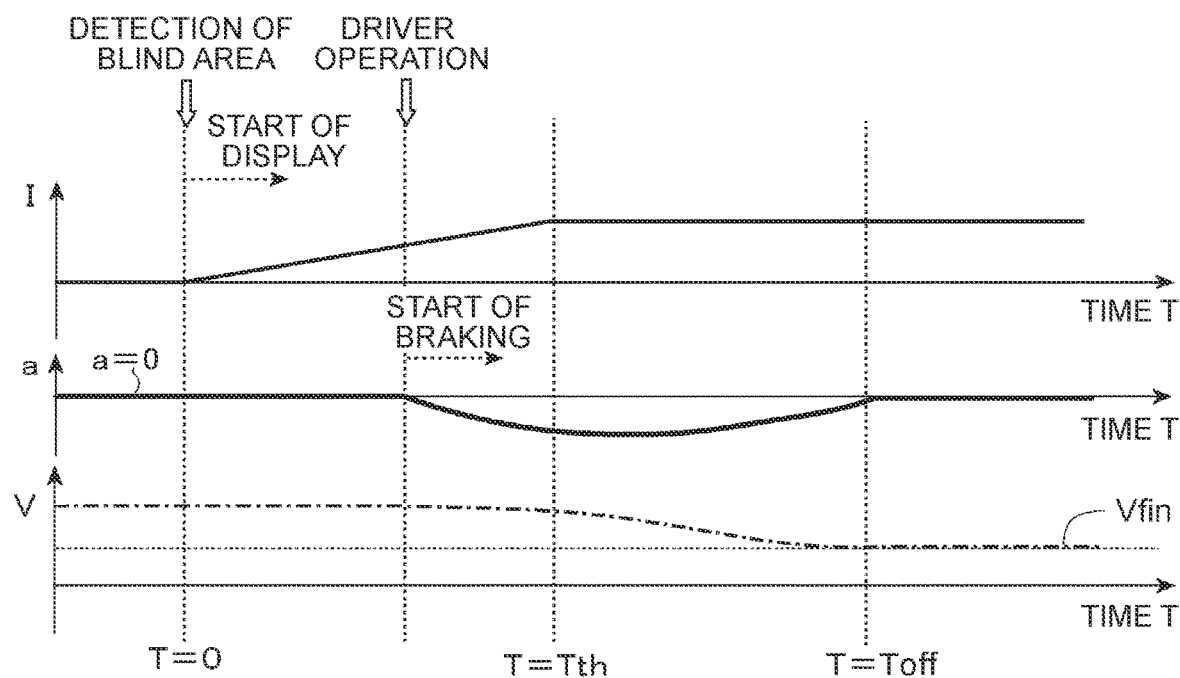
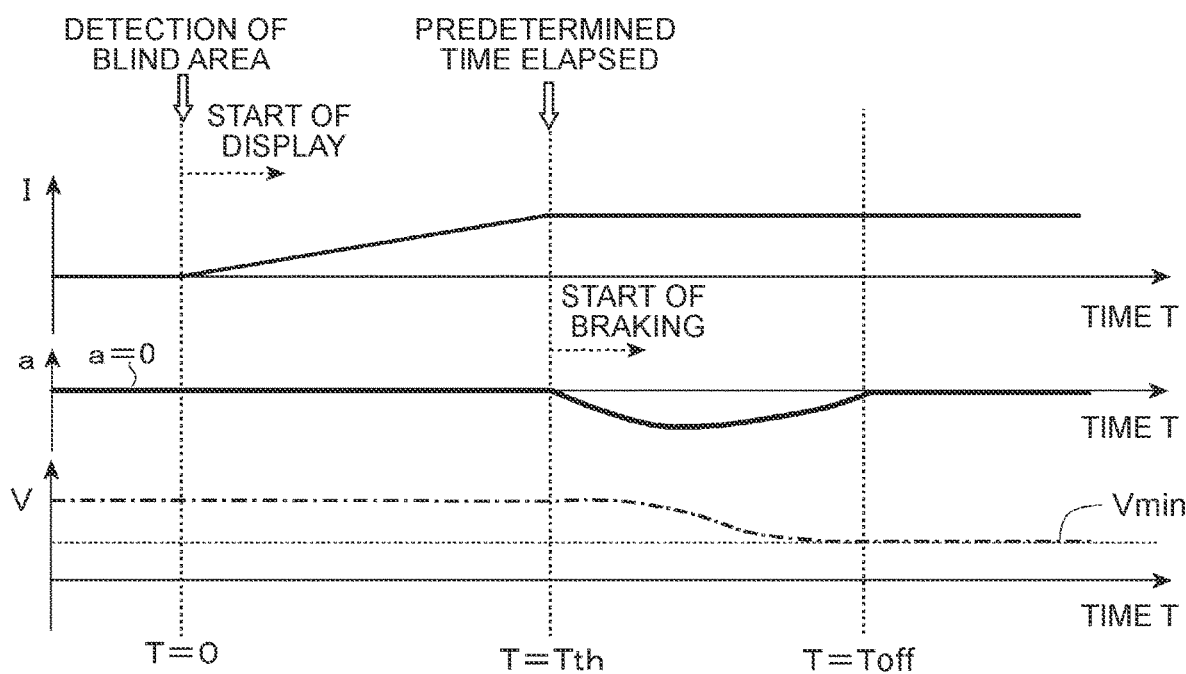

DRIVING ASSISTANCE CONTROL APPARATUS OF VEHICLE

INCORPORATION BY REFERENCE

The disclosure of Japanese Patent Application No. 2016-097595 filed on May 16, 2016 including the specification, drawings and abstract is incorporated herein by reference in its entirety.

BACKGROUND

1. Technical Field

The present disclosure relates to an apparatus for assisting driving of a vehicle, such as an automobile, and more particularly, to an apparatus that performs driving assistance so as to avoid collision caused by sudden emergence of a pedestrian, or the like (such as a bicycle), from a blind area as seen from the driver, for example, from behind an obstacle or a building at the side of a road, or so as to mitigate shock in the event of the collision.

2. Description of Related Art

Various types of systems that perform driving assistance for avoiding collision with a pedestrian, or the like, detected in a travelling direction of a vehicle, during traveling of the vehicle, have been proposed. For example, when an object is found in front of a vehicle during traveling, a system disclosed in Japanese Patent Application Publication No. 2009-286279 (JP 2009-286279 A) is configured to set the amount of lateral movement of the own vehicle for avoiding the object, according to the type of the object and its velocity relative to the own vehicle, and perform traveling control so as to achieve the lateral movement thus set. In Japanese Patent Application Publication No. 2013-171439 A (JP 2013-171439 A), it is proposed to determine whether driving assistance control is performed, based on change of the degree of closeness to an object found in front of a vehicle during traveling and change of driving operation, and determine a method (deceleration, steering) of the driving assistance. Further, a driving assistance system called "autonomous emergency braking system" (which may be abbreviated to "AEB") is proposed. In this system, when a pedestrian, or the like, that suddenly emerges in a traveling path of a vehicle during traveling, is detected, a warning that prompts braking operation is presented to the driver, and an autonomous collision avoidance brake is applied by the system if it is determined that the driver did not take action in response to the warning. Further, in "Studies on Autonomous Driving Intelligence System according to Optimum Control Theory in view of Potential Risk", Takahiro HASEGAWA, and four others, Society of Automotive Engineers of Japan, Proceedings of Academic Symposium 20145871, 2014, a system is proposed which autonomously executes deceleration and/or steering of a vehicle, when a blind area, such as an area ahead of a parked vehicle located at around the side of a road, is found during traveling of the vehicle, so as to avoid contact with a pedestrian, or the like, or mitigate shock, even if the pedestrian, or the like, actually suddenly comes out from the blind area.

SUMMARY

The above-indicated autonomous emergency braking system (AEB) and many other conventional systems are configured to execute deceleration and/or steering, when a pedestrian, or the like, that suddenly emerges on a road, is detected, and a risk of contact with the own vehicle becomes obvious. In this case, since it takes a certain amount of time for the system (machine) to obtain and analyze information concerning the surrounding environment, deceleration and/or steering may not be achieved to a desirable extent, when a pedestrian, or the like, suddenly comes out from a blind area (as seen from the own vehicle), such as space behind a parked vehicle, or behind an object, or a blind intersection with poor visibility. On the other hand, in the system as described in "Studies on Autonomous Driving Intelligence System according to Optimum Control Theory in view of Potential Risk", Takahiro HASEGAWA, and four others, Society of Automotive Engineers of Japan, Proceedings of Academic Symposium 20145871, 2014, at a point in time at which the system founds a blind area, it assumes that "a pedestrian, or the like, may suddenly come out", and executes deceleration or steering of the own vehicle before the pedestrian, or the like, is actually found. With this arrangement, even if the pedestrian, or the like, actually suddenly comes out from the blind area, the own vehicle speed can be reduced beforehand to a speed range in which the AEB can be appropriately activated, or the vehicle can be steered beforehand so as to travel along a course on which the own vehicle does not contact with the pedestrian, or the like. Thus, the control effect of the AEB can be exhibited sufficiently or to a desirable extent.

As described above, control that executes driving control, such as deceleration or steering, of the vehicle is performed simply based on finding of a blind area, namely, simply because of a possibility (potential risk) that a pedestrian, or the like, may suddenly come out from the blind area. If this control (which will be called "driving assistance control based on prediction of potential risk") is performed, the machine (system) would intervene in driving of the vehicle based on a judgement automatically programmed according to an artificial intelligent technology dealing with a potential risk, before the pedestrian, or the like, is found, namely, before the risk of collision between the own vehicle and the pedestrian, or the like, becomes obvious. Also, the prediction of the "potential risk" by the system (machine) does not necessarily match the driver's (human) determination of the potential risk based on perception and understanding of the surrounding environment, and the machine does not necessarily perform operation, such as deceleration or steering, against the potential risk, in the same manner as the driver. Therefore, it may be difficult for the driver to understand control operation of the system, or the driver may feel strange or uncomfortable about operation of the system since the driver's driving intention is not reflected at all.

As described above, the driver's feeling of strangeness against the control operation of the system should be avoided. Also, the driver will naturally feel strange or uncomfortable if the driver's driving intention is not reflected at all, even if safer operation of the vehicle can be achieved through the control of the system.

The present disclosure provides a driving assistance control apparatus that executes "driving assistance control based on prediction of potential risk" based on "potential risk" during traveling of the vehicle, wherein the feeling of strangeness against operation of the system is mitigated or reduced as far as possible.

A driving assistance control apparatus of a vehicle according to one aspect of the present disclosure includes a blind area detector, a driving operation detector, and an electronic control unit. The blind area detector is configured to detect the presence or absence of a blind area as seen from the vehicle in a traveling direction of the vehicle. The driving operation detector is configured to detect driving operation of a driver. The electronic control unit is configured to perform automatic deceleration control of the vehicle based on detection of the presence of the blind area by the blind area detector. The electronic control unit is configured to start the automatic deceleration control, by referring to the driving operation of the driver after detection of the presence of the blind area by the blind area detector.

In the above aspect of the present disclosure, "blind area" is an area or region of a blind spot, such as space ahead of a parked vehicle or an obstacle at the side of a road in the traveling direction of the own vehicle, or space behind a building, as seen from the driver of the vehicle or an environment recognizing means, such as a camera or a radar device installed on the vehicle. The "blind area detector" may be a device that detects or recognize an area that provides the "blind area", from information on the surroundings of the vehicle obtained from any means, such as a vehicle-mounted camera or a radar device, which is capable of detecting the circumferences surrounding the vehicle, or a GPS system. The above-mentioned "driving operation" may be any operation involved with driving of the vehicle, such as depression of the brake pedal or steering by the driver. The "driving operation detector" may be any device that determines whether any significant "driving operation" has been performed, and may be a sensing device or a determining device that determines whether the amount of depression of the brake pedal has exceeded a predetermined amount, or whether the steering angle of the steering wheel has exceeded a predetermined value, for example.

With the driving assistance control apparatus according to the above aspect, when the "blind area" is detected during traveling of the vehicle, a potential risk that a pedestrian, or the like, may suddenly come out from the blind area is predicted, and driving assistance control under which the vehicle is automatically decelerated is provided. However, as already described above, if the driving assistance control is performed with no regard to the driving operation of the driver, the driver may feel strange or uncomfortable about the assistance operation. Thus, in the apparatus of present disclosure, after a blind area is detected, the electronic control unit is configured to execute automatic deceleration, referring to driving operation of the driver. Namely, the electronic control unit does not immediately carry out automatic deceleration as driving assistance control in response to detection of a blind area, but performs the driving assistance control referring to driving operation of the driver. While the driving assistance control is expected to reflect the driving intention of the driver, automatic deceleration is carried out with reference to the driving operation of the driver, so that the driving intention of the driver is reflected in the driving assistance control, and the driver's feeling of strangeness is expected to be mitigated or reduced.

In the driving assistance control apparatus according to the above aspect, the electronic control unit may be configured to start the automatic deceleration control when braking operation or steering operation of the driver is detected after detection of the presence of the blind area. On the basis of the presence of braking operation or steering operation of the driver, it may be presumed that the driver found a blind area, predicted a potential risk in response to the finding, and intended to reduce the speed of the vehicle, or move the vehicle so as to avert it from an area (where a pedestrian, or the like, may suddenly emerge from the blind area) in which the potential risk is present. Accordingly, in this case, automatic deceleration is carried out in accordance with the driver's driving intention, and the driver is less likely or unlikely to feel strange or uncomfortable about execution of braking under assistance control that would be otherwise unexpected by the driver. In the driving assistance control apparatus according to the above aspect, the electronic control unit may be configured to start the automatic deceleration control when a predetermined time elapses after detection of the blind area. When the driver does not perform driving operation against a potential risk of sudden emergence from a blind area even after a certain amount of time elapses after detection of the blind area, but the vehicle continues to travel in the same fashion, the potential risk remains without being dealt with. Therefore, the automatic deceleration control may also be performed so as to deal with the potential risk, when the driver does not perform driving operation against the potential risk of sudden emergence even after a certain amount of time elapses. Thus, even if the deceleration control is unexpectedly started by the system, in place of the driver, when the driver does not perform driving operation that is expected to be performed by the expected time, the driver will notice his/her failure to pay attention to the blind area if the blind area actually becomes close to the own vehicle in accordance with automatic deceleration, and the driver's feeling of strangeness against the automatic deceleration control will be significantly reduced, as compared with the case where the automatic deceleration control is started early at the same as detection of the blind area.

The electronic control unit may execute automatic deceleration as driving assistance control in any manner or mode. The automatic deceleration control as the driving assistance control according to the above aspect is control for reducing the speed of the vehicle, in preparation for a risk or possibility that a pedestrian, or the like, may suddenly come out from a blind area, after detection of the blind area. Therefore, the automatic deceleration control is performed in a condition where no pedestrian, or the like, has been detected. When a pedestrian, or the like, actually suddenly comes out onto a road, on the other hand, contact avoidance operation may be performed by the AEB system as already described above. Accordingly, under the automatic deceleration control according to the above aspect, the electronic control unit may be configured to execute preliminary deceleration of the vehicle before execution of deceleration by the AEB system, at the time when the blind area is detected, so as to avoid contact with the pedestrian, or the like, with higher reliability, when the pedestrian, or the like, actually suddenly comes out from the blind area. In this case, it is preferable that the vehicle speed at the time when operation of the AEB system for avoidance of contact with the pedestrian, or the like, is started, or braking or steering is started by the driver, is sufficiently reduced for the purpose of avoidance of contact with the pedestrian, or the like. To this end, a deceleration needed for reducing the current vehicle speed to the above-mentioned vehicle speed depends on the relative distance between an entry region of a pedestrian, or the like, in a traveling path of the vehicle, where it is assumed that the pedestrian, or the like, suddenly comes out from the detected blind area, and enters the traveling path of the vehicle. In the driving assistance control apparatus according to the above aspect, the electronic control unit may be configured to assume that an object suddenly emerges from the blind area, and enters a traveling path of the vehicle, and calculate an entry region of the object within the traveling path. The electronic control unit may be configured to set a target deceleration based on a relative distance between the entry region and the vehicle. The electronic control unit may be configured to perform the automatic deceleration control so that an actual deceleration of the vehicle becomes substantially equal to the target deceleration.

When the driver himself/herself performs braking operation, during execution of the automatic deceleration control for making the actual deceleration of the vehicle with the target deceleration, it is preferable that the braking operation of the driver is reflected by movement of the vehicle, so that the driver's feeling of strangeness about the automatic deceleration control can be mitigated or reduced. Also, if the automatic deceleration control is performed, and braking action by the driver is further added to the control, the speed of the vehicle may be reduced by a degree exceeding the expectation of the driver, and the driver may feel strange or uncomfortable. In the driving assistance control apparatus as described above, the electronic control unit may be configured to apply braking force to the vehicle so as to compensate for a difference between the target deceleration and a deceleration applied by braking operation of the driver, when the automatic deceleration control is performed. With this driving assistance control apparatus, the driver can feel that his/her own braking operation is being reflected by vehicle behavior, and the actual deceleration of the vehicle can be controlled to the target deceleration.

In the driving assistance control apparatus as described above, the electronic control unit may be configured to set the target deceleration, based on a relative distance between the entry region and a target position set ahead of the entry region, and a target vehicle speed of the vehicle when the vehicle reaches the target position, the target position and the target vehicle speed being set as a position and a vehicle speed at which the vehicle speed can be reduced to be substantially equal to 0 by the time when the vehicle reaches the entry region from the target position. As described in "Studies on Autonomous Driving Intelligence System according to Optimum Control Theory in view of Potential Risk", Takahiro HASEGAWA, and four others, Society of Automotive Engineers of Japan, Proceedings of Academic Symposium 20145871, 2014, a position at which deceleration of the vehicle for avoiding contact with a hypothetical pedestrian, or the like, is started, which position is located ahead of an entry region of the pedestrian, or the like, in the traveling path of the vehicle, is set as a target position, and a vehicle speed at the target position, which can be substantially reduced to 0 by the time when the vehicle reaches the assumed entry region of the pedestrian, or the like, from the target position, is set as the target vehicle speed. In this manner, the target deceleration can be set depending on the relative distance between the target position and the entry region of the pedestrian, or the like, in the traveling path, and the target vehicle speed.

If the target deceleration is set such that it simulates a deceleration when a model driver, namely, a driver who performs ideal driving, drives the vehicle, ideal vehicle operation is expected to be realized. In this respect, according to the research of the inventors of present disclosure, a deceleration at which a given vehicle speed is reduced to a target vehicle speed during movement of the vehicle from a given position to a target position in operation of the model driver can be expressed by using a virtual spring potential obtained by modeling the braking force applied to the vehicle as repulsion from a pedestrian, or the like, as described in "Studies on Autonomous Driving Intelligence System according to Optimum Control Theory in view of Potential Risk", Takahiro HASEGAWA, and four others, Society of Automotive Engineers of Japan, Proceedings of Academic Symposium 20145871, 2014. In the driving assistance control apparatus as described above, the electronic control unit may set the target deceleration, based on a virtual spring potential. The virtual spring potential may be a spring potential obtained by modeling braking force applied to the vehicle as repulsion from the object, during deceleration operation performed by a model driver so as to decelerate the vehicle from a given vehicle speed to the target vehicle speed while the vehicle is moving from a given position to the target position. With the driving assistance control apparatus thus configured, when the automatic deceleration control is performed, ideal vehicle operation or movement that simulates operation of the model driver can be realized.

In the meantime, when the blind area detector detects a blind area, the driver does not necessarily recognize the blind area in the same manner, and does not necessarily predict a potential risk. Accordingly, the deceleration control of the vehicle by the driving assistance control apparatus according to the above aspect may be performed as control unexpected by the driver. Thus, the driving assistance control apparatus according to the above aspect may further include a risk presentation device configured to present a risk of sudden emergence of an object from the blind area, to the driver, when the blind area is detected. If the above risk is presented, the driver is able to predict a potential risk or possibility of sudden emergence of the object, and performs deceleration or steering of the vehicle by himself/herself, or the driver is prevented from feeling strange or uncomfortable about unexpected deceleration, at the start of execution of automatic deceleration control. Namely, according to the driving assistance control apparatus as described above, an interface that enables the driver to recognize the potential risk and grasp the manner of dealing with the risk by the apparatus is provided. The risk presentation device may be configured to visually indicate the risk of sudden emergence of the object. In this case, the risk presentation device may express that the risk of sudden emergence of the object becomes higher with passage of time. For example, increase of the risk or possibility of sudden emergence may be expressed by any method, for example, by increasing the brightness of a display of the risk, or increasing the blinking speed of the display.

The driving assistance control apparatus according to the above aspect may further include an accelerator pedal reaction force controller that applies reaction force to an accelerator pedal of the vehicle, during execution of the automatic deceleration control by the electronic control unit. With the driving assistance control apparatus thus configured, the driver feels that the accelerator pedal is heavier during execution of automatic deceleration control, so that useless acceleration of the vehicle is avoided, and the driver can be informed that the deceleration control is being performed by the apparatus.

Thus, when the driving assistance control apparatus according to the above aspect performs driving assistance control based on prediction of a potential risk or a possibility of sudden emergence of an object from a blind area, at a stage that the blind area is found, the electronic control unit performs automatic deceleration control, referring to driving operation of the driver after detection of the blind area, so that the degree of involvement of the driver with driving of the vehicle is increased, and the driver's feeling of strangeness against control operation is expected to be mitigated or reduced. Namely, after detection of the blind area, the automatic deceleration control is not started irrespective of driving operation of the driver, but is started after waiting for braking operation or steering operation of the driver, or at the time when a predetermined time elapses from detection of the blind area. If the automatic deceleration control is started at either of these points in time, the driver's manner of driving after detection of the blind area is referred to (monitored), and the driver's driving intention is reflected by the automatic deceleration control; therefore, a higher degree of coordination between the driver (human) and the apparatus (machine) can be obtained.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4A is a view schematically showing an example of changes of a display of a potential risk, deceleration of the vehicle, and the vehicle speed, with respect to time, according to the routine of FIG. 2C, in the case where, after detection of a blind area, driving operation performed by the driver in view of the blind area is detected before a predetermined time elapses;

FIG. 4B is a view schematically showing an example of changes of a display of a potential risk, deceleration of the vehicle, and the vehicle speed, with respect to time, according to the routine of FIG. 2C, in the case where, after detection of a blind area, no driving operation performed by the driver in view of the blind area is detected over a predetermined period of time;

DETAILED DESCRIPTION OF EMBODIMENTS

Figure 1A:
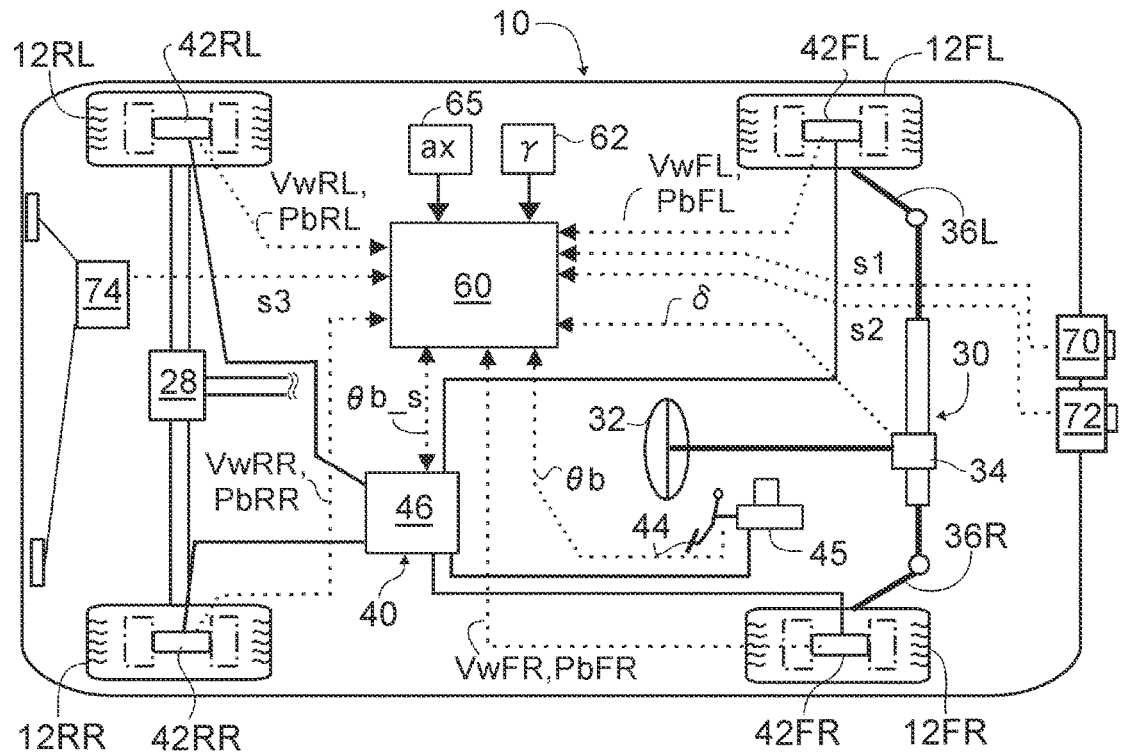
FIG. 1A is a schematic view of a vehicle on which a driving assistance control apparatus of a vehicle as a preferred embodiment of the present disclosure is installed.

Referring to FIG. 1A, in a vehicle 10, such as an automobile, in which a driving assistance control apparatus as a preferred embodiment of the present disclosure is incorporated, right and left front wheels 12FR, 12FL, right and left rear wheels 12RR, 12RL, a drive system (a part of which is shown in FIG. 1A), a steering device 30 for controlling the steering angle of the front wheels (a steering device for rear wheels may be further provided), and a braking system 40 that generates braking force in each wheel, are installed. The drive system generates braking/driving force in each wheel (of only the rear wheels, since the vehicle is a rear-wheel-drive vehicle, in the embodiment shown in FIG. 1A), according to depression of an accelerator pedal by the driver. The drive system is configured to transmit drive torque or rotational force, from an engine and/or an electric motor (not shown, the drive system may be a hybrid drive system having both an engine and an electric motor), to the rear wheels 12RR, 12RL, via a transmission (not shown), and a differential gear unit 28, in a normal mode. A power steering device may be employed as the steering device 30. The power steering device transmits rotation of a steering wheel 32 operated by the driver, to tie rods 36R, 36L, while boosting or increasing its torque by means of a booster 34, so as to turn the front wheels 12FR, 12FL.

The braking system 40 is an electronically controlled, hydraulic braking system of a type in which a braking pressure in a wheel cylinder 42$i$ (i=FR, FL, RL, RR) mounted in each wheel, namely, braking force in each wheel, is adjusted by a hydraulic circuit 46 that communicates with a master cylinder 45 that is operated in response to depression of a brake pedal 44 by the driver. The hydraulic circuit 46 is provided with various valves (such as a master-cylinder cut valve, hydraulic pressure holding valve, and a pressure reduction valve) for selectively communicating the wheel cylinder of each wheel with the master cylinder, oil pump, or an oil reservoir (not shown). In normal operation, the pressure of the master cylinder 45 is supplied to the respective wheel cylinders 42$i$, in response to depression of the brake pedal 44. As will be described later, when automatic deceleration control is performed after detection of a blind area, the above-indicated various valves are actuated, based on a command of an electronic control unit 60, so that the brake pressure in the wheel cylinder of each wheel is controlled to be equal to its target pressure, based on a detection value Pb$i$ (i=FR, FL, RR, RL) of a corresponding pressure sensor. The braking system 40 may be of a type that pneumatically or electromagnetically applies braking force to each wheel, or any type known to those skilled in the art.

In the vehicle 10 in which the driving assistance control apparatus as the preferred embodiment of the present disclosure is used, a vehicle-mounted camera 70, a radar device 72, etc. are provided for detecting the circumstances surrounding the vehicle, so as to detect another vehicle around the vehicle, obstacle, pedestrian, or the like (e.g., bicycle), road width, building, and so forth. Further, a GPS system (car navigation system) 74 may be provided which communicates with a GPS satellite, and obtains various kinds of information, such as the circumstances surrounding the own vehicle, and positional information.

Operation control of each part of the vehicle and operation control of the driving assistance control apparatus according to the present disclosure are performed by the electronic control unit 60. The electronic control unit 60 may include a microcomputer and a drive circuit of normal types. The microcomputer has CPU, ROM, RAM, and input/output port device, which are connected to each other via a bidirectional common bus. The configuration and operation of each part of the driving assistance control apparatus of the present disclosure, which will be described later, may be realized by operation of the electronic control unit 60 according to programs. The electronic control unit 60 receives detection values from various sensors, which are used as parameters for the driving assistance control of the present disclosure performed in manners as described later. For example, the electronic control unit 60 receives items of information s1-s3 from the vehicle-mounted camera 70, radar device 72, GPS system 74, etc., depression amount $\theta b$ of the brake pedal, steering angle $\delta$, detection value ax of a longitudinal G sensor 65, wheel speeds Vwi (i=FR, FL, RR, RL), and so forth. The electronic control unit 60 outputs a control command for presenting risk indication to the driver, a control command representing a control amount for use in the automatic deceleration control, etc., to corresponding systems or devices. Although not illustrated in the drawings, the electronic control unit 60 may receive various parameters needed for various controls to be performed in the vehicle of this embodiment, for example, various detection signals, such as the yaw rate $\gamma$ from a gyro sensor 62 and/or the lateral acceleration Yg, and may output various control commands to the corresponding systems or devices.

Figure 1B:
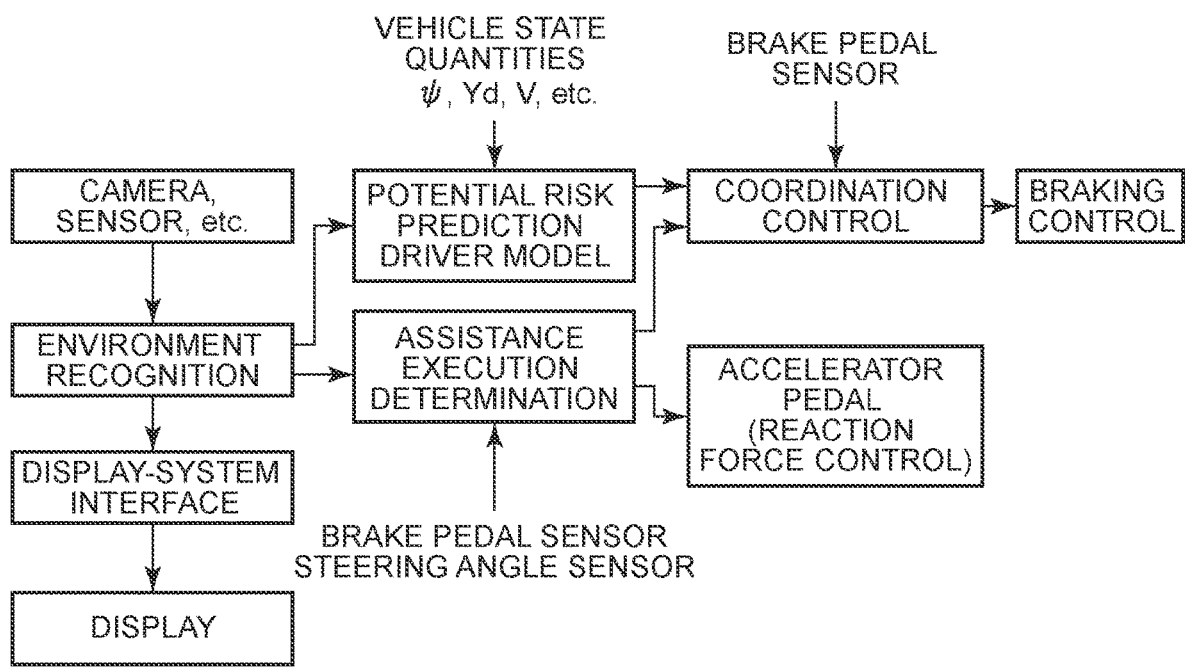
FIG. 1B is a block diagram showing the configuration of a system in the driving assistance control apparatus as one embodiment of the present disclosure.

In the system configuration of the driving assistance control apparatus according to the present disclosure, as shown in FIG. 1B, an environment recognizing unit, a display-system interface unit, a potential risk predicting unit, an assistance execution determining unit, and a coordination control unit are constructed. The environment recognizing unit recognizes the circumferences surrounding the vehicle, based on information of the camera, sensor, etc. If the environment recognizing unit detects the presence of a blind area as seen from the own vehicle, the information is given to the display-system interface unit, potential risk predicting unit, and the assistance execution determining unit. In the display-system interface unit, a process or routine of presenting risk indication on a display mounted in the vehicle is executed, in a manner as described later. In the potential risk predicting unit, a target deceleration for use in automatic deceleration control, and a control amount that achieves the target deceleration, are calculated, using a driver model that models driving behavior of a model driver, based on the positional information of the blind area and conditions (such as the vehicle speed) of the own vehicle, in a manner as described later. The assistance execution determining unit monitors driving operation of the driver, in a manner as described later, after receiving information on the presence of the blind area, and determines the timing of the automatic deceleration control. If execution of the automatic deceleration control is determined, the information is given to the coordination control unit. The coordination control unit determines a control command, based on the control amount for the automatic deceleration control determined by the potential risk predicting unit, and driving operation (braking operation) of the driver, and transmits the control command to a brake control system. Also, the assistance execution determining unit may execute control for increasing reaction force of the accelerator pedal in a manner as described later, during execution of the automatic deceleration control.

Figure 2A:
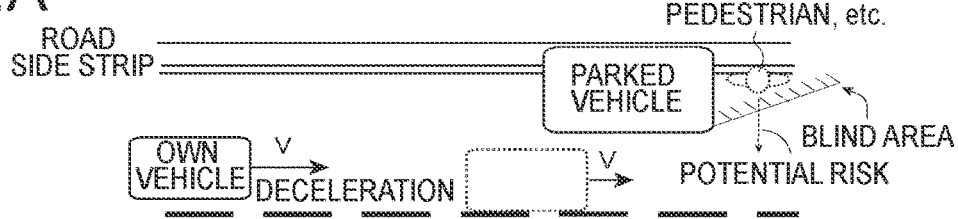
FIG. 2A is a schematic view useful for explaining a situation where driving assistance is carried out by the driving assistance control apparatus of the vehicle as the embodiment of the present disclosure.
Figure 2B:
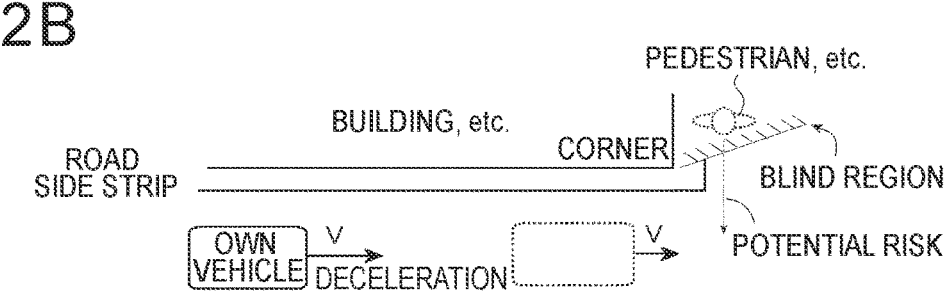
FIG. 2B is a schematic view useful for explaining a situation where driving assistance is carried out by the driving assistance control apparatus of the vehicle as the embodiment of the present disclosure.

In operation of the driving assistance control apparatus of the present disclosure, if a parked vehicle around a side strip of a road or a corner of a building is detected, during traveling of the vehicle (own vehicle), and the presence of a blind area behind the parked vehicle or building (ahead of the vehicle or building as seen from the own vehicle) is recognized, as schematically depicted in FIG. 2A, FIG. 2B, a possibility that a pedestrian, or the like, may suddenly emerge or come out from the detected blind area is assumed, as a potential risk, and automatic deceleration of the own vehicle is carried out in preparation for the potential risk. However, if the apparatus immediately executes the automatic deceleration control, simply because of detection of the blind area, the intention or operation of the control of the apparatus may not be understood by the driver, or the intention or operation of the control of the apparatus may not accord with the intention of the driver. As a result, the driving operation of the driver may not be reflected by the vehicle behavior, and the driver may feel strange or uncomfortable about the control operation of the apparatus. Thus, under the driving assistance control performed by the apparatus of this embodiment, the automatic deceleration control is not immediately executed, at the time when the presence of the blind area is detected or recognized, but the presence of the potential risk is presented to the driver, and driving operation of the driver is monitored. Then, if the driver starts braking operation or steering operation in an attempt to avoid the potential risk, the apparatus may also start the automatic deceleration control, in accordance with the driver's operation. Also, if the driver does not perform braking operation or steering operation, even after a lapse of a predetermined time from detection of the blind area, the automatic deceleration control may be performed.

Figure 2C:
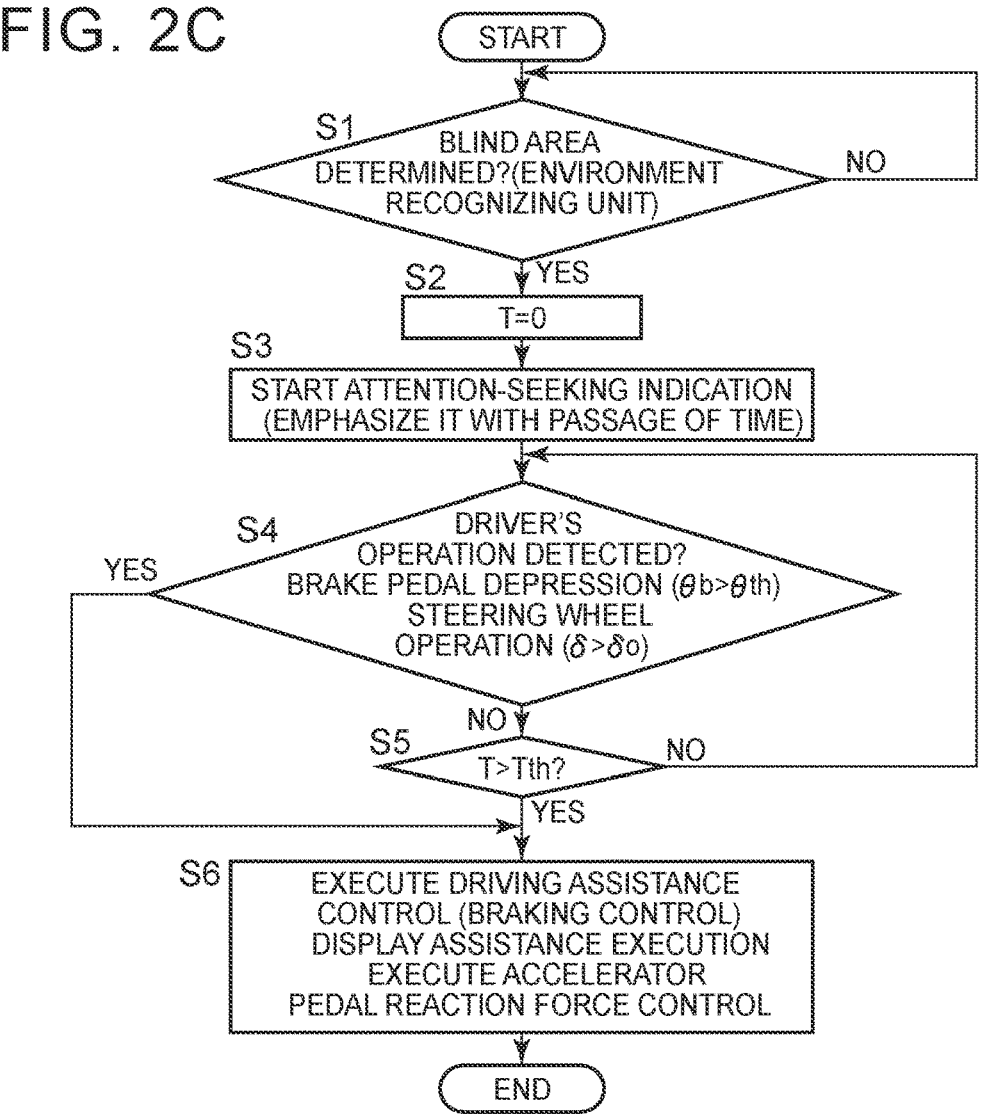
FIG. 2C is a flowchart illustrating a routine executed in the driving assistance control apparatus as the embodiment of the present disclosure.

Referring to FIG. 2C, in a control routine of the driving assistance control performed by the apparatus of this embodiment, the circumstances surrounding the vehicle are initially monitored by the environment recognizing unit, during traveling of the vehicle, and detection of a blind area is carried out (step S1). The circumstances surrounding the vehicle may be monitored in any manner, using devices, such as the vehicle-mounted camera 70, radar device 72, and the GPS system 74, for collecting information on the surroundings of the vehicle. Then, if a parked vehicle, an obstacle, a corner of a building, a blind intersection (i.e., an intersection with poor visibility), or the like, is recognized, based on the information obtained by the camera, and other devices, it may be determined that there exists a blind area behind it.

Figure 3A:
FIG. 3A is a view schematically showing an example of a risk display indicating the presence of a potential risk (sudden emergence of a pedestrian, or the like, from a blind area) visually presented to the driver, after detection of the blind area, during traveling of the vehicle, in the driving assistance control apparatus of the vehicle as the embodiment of the present disclosure.

If the presence of the blind area is determined, time T representing an elapsed time from the determination is reset, or set to 0 (T=0) in step S2. While the elapsed time T is being measured (steps S2-S5), attention-seeking indication for presenting a potential risk due to the presence of the blind area to the driver is started (step S3), and monitoring of the driving operation of the driver is performed (step S4). In the attention-seeking indication operation, visual indication for calling the driver's attention to sudden emergence of a pedestrian, or the like, as shown in FIG. 3A by way of example, is presented on a display (not shown) located in the vicinity of the dashboard in front of the driver's seat, for example. In this case, it is preferable to emphasize or highlight the indication by increasing the brightness or blinking speed of the display, as time elapses from immediately after detection of the blind area, so as to express gradual increase of the degree of the potential risk. With this arrangement, the driver shares information that the apparatus recognizes the presence of the potential risk, and the intention of the apparatus for control is transmitted to the driver.

In the step (step S4) of monitoring the driving operation of the driver, depression of the brake pedal by the driver or manipulation of the steering wheel by the driver is monitored, as driving operation of the driver for avoiding a potential risk. For example, it may be determined that the driving operation for avoiding the potential risk has been performed, when the amount θb of depression of the brake pedal has exceeded a predetermined value θth, or the amount of change of the steering angle δ of the steering wheel has exceeded a predetermined angle δo in a such a direction that the vehicle moves away from the blind area.

Figure 3B:
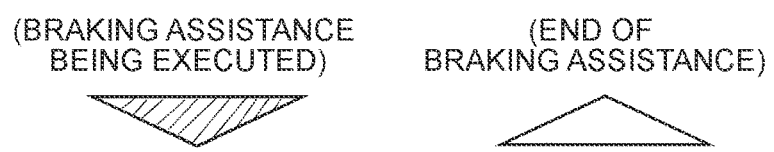
FIG. 3B is a display presented during execution of automatic deceleration control, and a display presented at the completion of the automatic deceleration control, in the driving assistance control apparatus as the embodiment of the present disclosure.
Figure 3C:
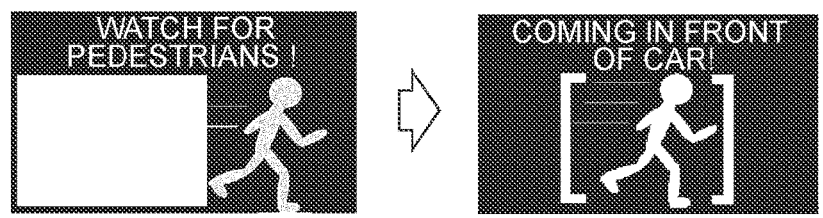
FIG. 3C is a view schematically showing an example (right side) of a display presented when a pedestrian, or the like, actually comes out from a blind area, after detection of the blind area, in the driving assistance control apparatus of the vehicle as the embodiment of the present disclosure.

If the driver's driving operation for avoiding the potential risk is detected in this manner, automatic deceleration control is executed in a manner as described later, in response to the detection (step S6). Also, if no driving operation for avoiding the potential risk is performed, irrespective of the attention-seeking indication or display, automatic deceleration control is executed based on determination of the apparatus, when the elapsed time T exceeds the predetermined value Tth. During execution of the automatic deceleration control, an indication to the effect that the deceleration control is being performed may be displayed in a given portion of the dashboard in front of the driver's seat, for example, as illustrated on the left-hand side in FIG. 3B. Then, when the automatic deceleration control ends, an indication of the end of the control may be presented, as illustrated on the right-hand side in FIG. 3B.

Further, during execution of the automatic deceleration control, control for applying reaction force to the accelerator pedal against depression of the accelerator pedal may be performed, so as to prevent useless acceleration of the vehicle, and inform the driver of the fact that the deceleration control is being executed by the apparatus. More specifically, during execution of the automatic deceleration control, reaction force F as expressed below may be applied to the accelerator pedal, in such a direction as to make the accelerator pedal stroke P equal to 0.

$$F=-Ka \cdot P \quad (1)$$

In the above expression (1), Ka is a positive coefficient. Namely, the reaction force F increases as the accelerator pedal stroke P increases.

Referring to FIG. 4A and FIG. 4B, the flow of control as described above will be summarized. If a blind area is detected during traveling of the vehicle, T is reset to 0, and attention-seeking indication or display is started. The indication is gradually emphasized by increasing the brightness or blinking speed I of the display with time, so that the driver can recognize and grasp the potential risk detected by the apparatus with higher reliability. Then, if driving operation of the driver is detected, as shown in FIG. 4A, the automatic deceleration control is executed from that point in time, so that a deceleration "a" is applied to the vehicle, and the vehicle speed V is reduced. On the other hand, if the elapsed time T after detection of the blind area reaches Th, as shown in FIG. 4B, the automatic deceleration control is executed from that point in time, even in the absence of driving operation of the driver, so that a deceleration "a" is applied to the vehicle, and the vehicle speed V is reduced.

If a pedestrian, or the like, actually emerges or comes out from the blind area, during execution of the above control routine or after completion of the automatic deceleration control, deceleration control may be performed by an AEB system, or braking operation or steering operation of the driver himself/herself may be expected. In this case, the attention-seeking indication may be converted from indication of a potential risk to indication of actual occurrence of the risk (sudden emergence of a pedestrian, or the like).

As explained above with reference to FIG. 2A and FIG. 2B, the automatic deceleration control performed in the apparatus of this embodiment is control for predicting a risk or possibility that a pedestrian, or the like, may suddenly come out from a blind area, when the presence of the blind area is detected, and decelerating the vehicle in advance, in a condition where sudden emergence of the pedestrian, or the like, has not been detected. In fact, a model driver is expected to predict a risk of sudden emergence of a pedestrian, or the like, when he/she finds a blind area, under the situations illustrated in FIG. 2A, FIG. 2B, and decelerate the vehicle, even in a condition where no pedestrian, or the like, has been found, so as to avoid contact with a pedestrian, or the like, with higher reliability when the pedestrian, or the like, actually suddenly emerges from the blind area. The automatic deceleration control of this embodiment may be said to be control that simulates driving of the model driver as described above.

Under the automatic deceleration control, brake control assistance is performed based on a potential risk prediction driver model. In this case, a brake control assistance system includes the environment recognizing unit, potential risk prediction driver model unit, and assistance execution determining unit, as shown in FIG. 1B. The potential risk prediction driver model sets a deceleration calculated from optimization of a potential function that can simulate decelerating operation of a model driver, and an evaluation function defined by a risk evaluation term using the potential function and an operation amount term used for control, as a target deceleration. The calculated target deceleration is converted into a pedal stroke amount. Then, coordination control is performed by comparing the pedal stroke amount entered by the driver with the pedal stroke amount entered by the assistance system, and selecting the larger one of the pedal stroke amounts. The selected pedal stroke amount is then received by the vehicle.

1. Environment Recognizing Unit When an environment recognition sensor (camera) detects a parked vehicle, space behind an object, a blind intersection with no signal, or the like, the environment recognizing unit assumes that a pedestrian, or the like, who is currently invisible will suddenly emerges in front of the vehicle, and transmits a flag indicating the assumption to the potential risk prediction driver model unit.

2. Potential Risk Prediction Driver Model When the control flag is transmitted from the environment recognizing unit to the potential risk prediction driver model unit, the potential risk prediction driver model unit calculates the target deceleration.

Figure 5A:
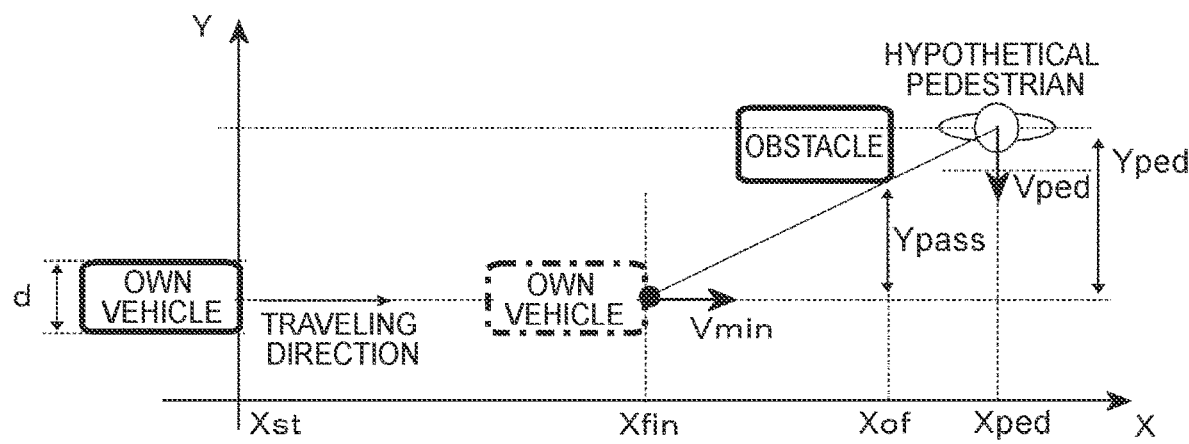
FIG. 5A is a schematic view of a situation where automatic deceleration control is performed in the driving assistance control apparatus of the present disclosure, which view is useful for explaining a target position and a target speed referred to in determination of a target deceleration for use in control.
Figure 5B:
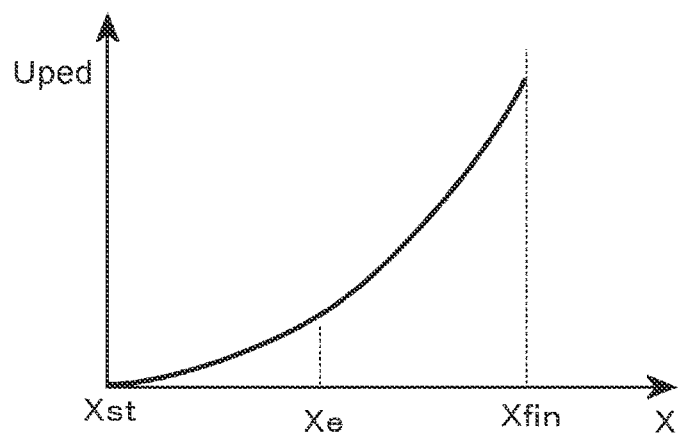
FIG. 5B is a schematic view of a virtual spring potential obtained by modeling braking force applied to the vehicle in decelerating operation when a model driver reduces the vehicle speed from a given speed to a target vehicle speed during movement of the vehicle from a given position to a target position, as repulsion from a pedestrian, or the like, the virtual spring potential being referred to in determination of a target deceleration during automatic deceleration control.
Figure 5C:
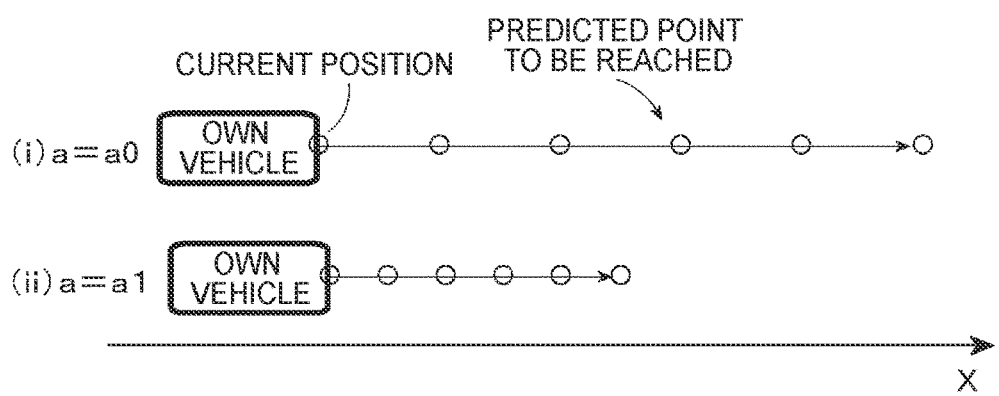
FIG. 5C is a view schematically illustrating an example of predicted positions of the vehicle referred to in determination of a target deceleration under automatic deceleration control.

A repulsion potential function of a hypothetical pedestrian is defined as follows.

$$Uped = \frac{1}{2}Kped(Xst - Xe(t))^2 \quad (Xst < X(t) < Xfin) \quad (1)$$

where, Kped denotes a spring constant of the repulsion potential of the hypothetical pedestrian, and Xst and Xfin denote the minimum X coordinate and the maximum X coordinate, respectively, between which the repulsion is received, and also denote the deceleration start position and the deceleration ending position (see FIG. 5B).

[Method of Calculating Spring Constant] In traveling space, where the sum of the potential energy produced by a virtual spring and kinetic energy is conserved, the spring constant Kped of the repulsion potential of the hypothetical pedestrian is expressed as follows.

$$Kped = \frac{m(V^2\min - V(t)^2)}{(Xst - Xe(t))^2 - (Xst - Xfin)^2} \quad (2)$$

Here, the spring constant Kped is not constant. The spring constant Kped is characterized by changing for each sampling period, according to the own vehicle position Xe and the approaching velocity V.

Vmin, Xfin in the above equation (2) are obtained from the following equations (3), (4).

$$V\min = a_{max}\left(-\tau_x + \sqrt{\tau_x^2 + \frac{2(\tilde{X}ped - Xfin)}{a_{max}}}\right) \quad (3)$$

$$Xfin = -V\min\tau_x - \frac{V^2\min}{2a_{max}} + \tilde{X}ped \quad (4)$$

The coordinate position Xfin, at which the brake control based on the potential risk prediction driver model ends, changes according to the position Yped of the hypothetical pedestrian calculated based on a lateral interval Ypass between the own vehicle and the parked vehicle (see FIG. 5A). In the above equation (4), τx indicates a response time (recognition time) of the AEB, and $a_{max}$ indicates the maximum acceleration of the AEB. Namely, it is necessary to reduce the vehicle speed to Vmin at the operating position of Xfin, so as to avoid a collision through operation of the AEB when a pedestrian suddenly emerges in front of the vehicle.

[Method of Calculating Target Deceleration of Potential Risk Prediction Driver Model] The target deceleration ax* is determined by optimizing trade-off between the repulsion potential Uped with the hypothetical pedestrian at the predicted position of the own vehicle indicated by the following equation (5), and the magnitude of the target deceleration ax*.

$$X_{px}(i_x, j_x) = Xe(t) + V(t)t_{px}(j_x) + \frac{1}{2}a_x(i_x)t_{px}(j_x)^2 \quad (5)$$

Here, the evaluation function is given by the following equation (6).

$$a_x^*(t) = \min_{a_{px}(i_x)} \sum_{j_x=1}^{Nx} (Uped(X_{px}(i_x, j_x)) + r_x a_x^2) \quad (6)$$

In this connection, restrictions on the target deceleration are expressed by $0 \le a_x(ix) \le a_{xmax}$. In the above equation (6), a deceleration at which the total value of Uped that expresses the risk within a predicted time as indicated by Eq. (7) below and the total value of the target deceleration are minimized is determined.

$$t_{px}(j_x) = \Delta t_{px} j_x (j_x = 0, 1, 2, \ldots, N_x) \quad (7)$$

The target deceleration ax* of the potential risk prediction driver model is converted into the pedal stroke amount by Eq. (8) below.

$$P_{b-s} = -K_{ffa}a_x^* - K_{fbPa}(a_x^* - a_x) - K_{fbP-V}(V^* - V) + b \quad (8)$$

where Kffa is an acceleration FF gain, KfbPa is an acceleration FB proportional gain, KfbPV is a velocity FB proportional gain, and b is a play of the stroke.

While the above description is concerned with the embodiment of the present disclosure, many modifications and changes can be easily made by those skilled in the art. It would be apparent that the present disclosure is not limited only to the illustrated embodiment, but may be applied to various apparatuses or systems without departing from the concept of the present disclosure.

What is claimed is:

1. A driving assistance control apparatus of a vehicle, comprising:
    a blind area detector configured to detect a blind area associated with a potential risk in front of the vehicle;
    a driving operation detector configured to detect a braking operation or a steering operation performed by a driver of the vehicle to avoid the potential risk in front of the vehicle; and
    an electronic control unit (ECU) configured to:
        determine whether the braking operation or the steering operation is performed by the driver of the vehicle within a threshold timeframe after detection of the blind area;
        execute braking control before the threshold timeframe elapses, to avoid the potential risk in front of the vehicle, in response to determining that the braking operation of the steering operation is performed by the driver within the threshold timeframe; and
        execute the braking control after the threshold timeframe elapses, to avoid the potential risk in front of the vehicle, based on determining that the braking operation or the steering operation is not performed by the driver within the threshold timeframe.

2. The driving assistance control apparatus according to claim 1, further comprising:
    a risk presentation device configured to present a risk of sudden emergence of the potential risk from the blind area, to the driver, based on the blind area being detected.

3. The driving assistance control apparatus according to claim 2, wherein the risk presentation device is configured to visually indicate the risk of sudden emergence of the potential risk, and express that the risk of sudden emergence of the potential risk becomes higher as the threshold timeframe elapses.

4. The driving assistance control apparatus according to claim 1, wherein the ECU is further configured to:

assume that the potential risk suddenly emerges from the blind area, and enters a traveling path of the vehicle;

calculate an entry region of the potential risk within the traveling path;

set a target deceleration based on a relative distance between the entry region and the vehicle; and execute the braking control so that an actual deceleration of the vehicle becomes substantially equal to the target deceleration.

5. The driving assistance control apparatus according to claim 4, wherein the ECU is further configured to apply braking force to the vehicle so as to compensate for a difference between the target deceleration and a deceleration applied by the braking operation of the driver, based on executing the braking control.

6. The driving assistance control apparatus according to claim 4, wherein:

the ECU is configured to set the target deceleration, based on a relative distance between the entry region and a target position set ahead of the entry region, and a target vehicle speed of the vehicle when the vehicle reaches the target position, the target position and the target vehicle speed being set as a position and a vehicle speed at which the vehicle speed can be reduced to be substantially equal to zero by a time when the vehicle reaches the entry region from the target position.

7. The driving assistance control apparatus according to claim 6, wherein the ECU is further configured to set the target deceleration, based on a virtual spring potential, which is a spring potential obtained by modeling braking force applied to the vehicle as repulsion from the potential risk, so as to decelerate the vehicle from a given vehicle speed to the target vehicle speed while the vehicle is moving from a given position to the target position.

8. The driving assistance control apparatus according to claim 1, further comprising an accelerator pedal reaction force controller that applies reaction force to an accelerator pedal of the vehicle, during execution of the braking control by the ECU.

9. A method comprising:

detecting a blind area associated with a potential risk in front of a vehicle;

determining whether a braking operation or a steering operation is performed by a driver of the vehicle within a threshold timeframe after detection of the blind area;

executing braking control before the threshold timeframe elapses, to avoid the potential risk in front of the vehicle, in response to determining that the braking operation or the steering operation is performed by the driver within the threshold timeframe; and executing the braking control after the threshold timeframe elapses, to avoid the potential risk in front of the vehicle, based on determining that the braking operation or the steering operation is not performed by the driver within the threshold timeframe.

* * * * *